United States Patent [19]

Jaswa et al.

[11] Patent Number: 4,594,651
[45] Date of Patent: Jun. 10, 1986

[54] CONCURRENT PROCESSOR FOR CONTROL

[75] Inventors: Vijay C. Jaswa, Clifton Park; Charles E. Thomas, Scotia, both of N.Y.

[73] Assignee: General Electric Company, Schenectady, N.Y.

[21] Appl. No.: 571,757

[22] Filed: Jan. 18, 1984

[51] Int. Cl.⁴ ............................................. G06F 9/00
[52] U.S. Cl. .................................... 364/131; 364/180
[58] Field of Search ........ 364/131, 135, 200 MS File, 364/180, 160, 704; 318/590, 596

[56] References Cited

U.S. PATENT DOCUMENTS

| | | | |
|---|---|---|---|
| 3,248,706 | 4/1966 | Christensen | 364/200 |
| 4,022,555 | 5/1977 | Smith | 364/180 |
| 4,118,771 | 10/1978 | Pomella | 364/200 |
| 4,128,876 | 12/1978 | Ames | 364/200 |
| 4,152,761 | 5/1979 | Louie | 364/200 |
| 4,193,022 | 3/1980 | Bertolasi | 318/596 |
| 4,395,758 | 7/1983 | Helenius | 364/200 |
| 4,425,664 | 1/1984 | Sherman | 364/200 |
| 4,443,846 | 4/1984 | Adock | 364/200 |
| 4,462,072 | 7/1984 | Tague | 364/200 |

Primary Examiner—Jerry Smith
Assistant Examiner—Allen MacDonald
Attorney, Agent, or Firm—Donald R. Campbell; James C. Davis, Jr.; Paul R. Webb, II

[57] ABSTRACT

This computer architecture is optimized for computing the state transitions of a controller, whereas conventional computers are optimized for data manipulation. The concurrent processor for control efficiently implements both the continuous and discrete control functions and has a processing element with two parts, the continuous and discrete processing elements. An arbitrary number of processing elements in a linear array have nearest-neighbor communications, and a general purpose microprocessor is provided to interact with them. Continuous states are computed concurrently and there is provision for interaction between continuous and discrete controls.

16 Claims, 7 Drawing Figures

CONCURRENT PROCESSOR FOR CONTROL

BACKGROUND OF THE INVENTION

This invention relates to apparatus for solving control problems and more particularly to a computer architecture for implementing real-time controllers.

The use of conventional microprocessors for real-time control represents an adaptation of a tool developed for information processing and data manipulation, such as encountered in the business world, into a tool for control purposes. The Von Neumann architecture of conventional microprocessors, which do sequential processing, is very inefficient for control purposes. Hence a different tool is needed for solving control problems in real time in a more efficient manner. With the decreasing cost of integrated circuits it becomes feasible to devise special-purpose devices aimed at a particular class of applications. While there are numerous examples of architectures for signal processing, few control type architectures exist, primarily becaust most real-time control applications appear not to be too demanding of general-purpose microprocessors in terms of speed and performance. The need for a special control-oriented architecture exists for two reasons—for fulfilling the needs of more demanding applications than can be served by commercial microprocesssors, and for improving the ease with which applications can be implemented. The availability of a more powerful tool will open up more of the demanding applications that could not be done with microprocessors.

The ease of implmentation issue arises from the fact that the new architecture provides support for manipulating the status of the controller rather than simply bit or byte manipulation and in that sense raises the level of implementation and brings it closer to the highest level description of the controller, which is the state transition specification level. With conventional architectures, real-time control problems are solved by using ploys such as multi-tasking and real-time clock interrupts to simulate the occurrence of iteration steps. Processes that occur in parallel are simulated in sequential fashion. Thus real-time controllers become difficult to design, code and debug. There is a tremendous degradation in speed of computation and a corresponding increase in complexity as the order of the controller increases, where the order is defined as the number of internal states required to represent the controller.

The concurrent processor architecture for control characterizes a controller in terms of the sets of continuous and discrete states of the system and logically as well as physically separates the two sets. This dichotomy results in a simpler specification of the rules for state transitions. For continuous states, the state equation representation of a continuous control is a convenient way to specify the behavior of the controller; whereas, for discrete states, Boolean functions are a convenient way of specifying the behavior of a discrete controller or a finite-state machine. Since a real-time controller generally requires interaction between its continuous and discrete states, there must be provision for the continuous states to affect the discrete and vice versa. Comparison actions define the operation whereby the continous states affect the discrete. However, the effects of a discrete variable on the controller are many—state equation coefficients may need to be modified in arbitrary ways or new inputs may need to be applied to the state equations as discrete variables change state.

SUMMARY OF THE INVENTION

A primary object of the invention is to obtain an efficient and fast mechanism for implementing digital controllers, and to provide a simple means of expansion as the order of the controller increases.

Another object is the provision of a set of processing elements in which the logical interconnections are changed without changing the physical interconnections in order that the same processing elements may be used for many purposes, for real-time control of processes and equipment, and also to implement mathematical and signal processing functions, such as discrete Fourier transforms and matrix multiplication.

Among other objects is to provide a processor architecture that is designed to efficiently implement both the continuous and discrete control functions.

Some of the features of the invention have already been described. The concurrent processor architecture for control (CPAC) according to an illustrative embodiment utilizes multiple, identical processing elements that are interconnected in a linear array. The processing element is comprised of a continuous processing element (CPE) and discrete processing element (DPE) in two-way communication. The CPE computes continuous state variables and one or more rows of a state equation is discretized matrix notation; the DPE operates simultaneously and computes discrete state variables. Communication means are provided between processing elements to transfer present continuous state values and external inputs, if present, in sequence to the processing elements which concurrently calculate next continuous state values. A general purpose microprocessor interacts with every processing element, for instance to examine the state of the CPAC or to give new control set-point commands. The CPE and DPE share a common bus, split into two, to allow them to operate simultaneously and asynchronously. The CPE controller is a hard-wired control in contrast to the DPE controller which is a program driven control with a specialized instruction set. Every instruction desirably has conditional execution capability to allow a discrete state variable to affect a continuous state variable in a single instruction.

The outputs of the processing elements are computed state variables which are presented to the controlled equipment, which in turn provides inputs to the PEs. A digital controller can be implemented with a single CPAC processing element containing one CPE and one DPE; this is adequate to control the plane or equipment in some applications.

The CPAC architecture is further a modular, extensible architecture; the basic processing element can be replicated over and over to create larger systems, thus leading itself to VLSI (very large scale integrated circuit) implementation.

DETAILED DESCRIPTION OF THE INVENTION

This computer architecture for implementing real-time digital controllers provides support for directly manipulating control states instead of bytes or words and brings the implementation closer to the problem specification. This is diagrammed as follows.

HIERARCHY OF CONTROL PROBLEM IMPLEMENTATION

English Language Problem Specification Level

↓

State Transition Description Language Level
(CPAC Implementation)

↓

Pascal or Other High Level Language Description Level
(Microcomputer Implementation)

Before continuing, it will be appreciated that real-time control of plants, equipment or processes is of two types. These two types are distinct because of the types of variables that each operates upon. Continuous control operates upon analog variables (such as temperatures or pressures) and is often implemented by analog electronics. Discrete control operates upon discrete variables such as relay inputs, switches or solenoid outputs. When both types of control are implemented by a microprocessor, then, they can be distinguished by the variable that they operate on—multi-bit (analog) variables or single-bit (discrete or Boolean) variables. Accordingly, the state variables of a system are either continuous states or discrete states.

Continuous controllers, as is known, can be represebted in a discretized state variable matrix notation as follows:

$$\bar{x}_{K+1} = \bar{A}_K \bar{x}_K + \bar{B}_K \bar{u}_K \qquad (1)$$

The continuous controller equations are discretized in (1) since the digital implementation of the controller will be a sampled-data system. (This is a difference equation which is the equivalent of the analog differential equations). However, the state variable vector $\bar{x}$ will still be referred to as the continuous state vector of the controller, and $\bar{u}$ will be referred to as the vector of continuous system inputs to the controller. Equation (1) describes a linear time variant controller since the equation is linear in $\bar{x}$ and $\bar{u}$ and the coefficient matrices $\bar{A}$ and $\bar{B}$ are both functions of time. This type of controller represents a fairly large class of controllers that includes the conventional Proportional plus Integral plus Derivative (PID) controller and state controllers. Other problems in the controls area that are implemented in this form are Kalman filters with steady state gains, finite impulse response filters and models of the controlled plant for adaptive controllers. Thus a portion of the CPAC architecture is dedicated to directly implementing equation (1). Since the computation involved is fixed in nature, the algorithm is "hardwired" to provide performance improvement. The matrix representation also suggests that concurrency can be used to exploit the parallel nature of the computation. Each row of the matrix equation may be computed by a concurrently executing processing element—that is, one processing element can be allotted to compute the $k+1$ value of each state variable, which may then be communicated to the other processing elements for use in computing the state variables at the next iteration step. Thus, as the order of the system grows, the computation time per iteration increases with order n instead of order $n^2$.

Apart from the continuous controller, a typical real-time controller deals with discrete (or Boolean) states as well. Mechanisms to describe the behaviour and implementation of discrete state controllers are many—Boolean equations and relay-logic ladder diagrams describe the implementation of finite-state machines or programmable logic controllers. By separating the continuous controller from the discrete controller and using for each an implementation that is most suited to implementing the type of control that handles the particular state variables of interest, considerable efficiency is observed in function ahd in resources such as storage area. The discrete controller typically performs Boolean functions on the bit variables of the discrete half of the controller. The mechanisms that allow interaction of the continuous state controller and the discrete state controller are well-defined. The only way in which an "event" can occur in the continuous world is when a continuous input or state variable crosses a threshold. Hence only comparisons are needed to set or reset discrete variables. Thus architectural support must be provided for comparing continuous variables and having the result affect a discrete variable. For instance, temperature may be controlled to increase gradually and at 100° an event occurs. However, the interactions in the other direction are not as straight-forward. The occurrence of a discrete event may cause coefficients of the continuous controller to be changed in a prescribed fashion or cause new inputs to be applied to the system or indeed change the form of the continuous controller completely. For instance, at the end of the workday a continuous temperature controller is commanded to lower the room temperature. Thus architectural support must be provided for any of these things to happen.

Figure 1:
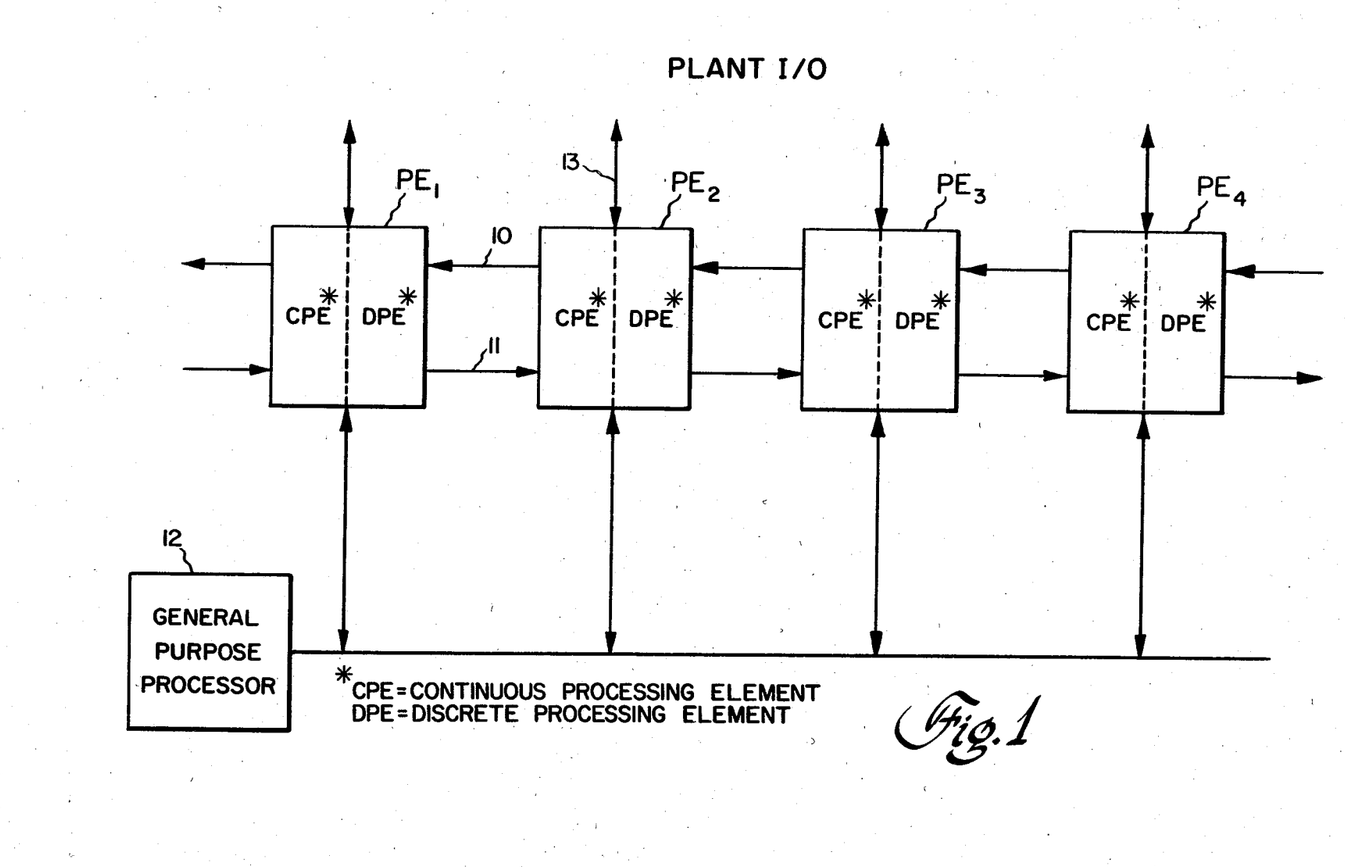
FIG. 1 shows the basic architecture of a preferred embodiment of the concurrent processor for control.

The concurrent processor architecture for control according to a preferred embodiment is comprised of an arbitrary number of processing elements interconnected in a linear array with nearest-neighbor type communications. It is likely to be used in co-processing fashion in most applications with some general purpose microprocessor. In FIG. 1, four identical or substantially identical processing elements $PE_1$ to $PE_4$ are connected to the nearest PEs by serial communication links 10 and 11; the first and last PEs are interconnected to provide loops for data transfer. A general purpose processor 12, such as one of the many now commercially available, is coupled to every processing element and has two-way communication with each. Input and output from the plant or controlled equipment is by means of two-way communication links 13 to the individual processing elements. Every PE contains a Continuous Processing Element (CPE) controller and a Discrete Processing Element (DPE) controller. The CPE and the DPE share a common bus (see FIG. 2), split into two, so as to allow the CPE and DPE to operate simultaneously and asynchronously. The CPE controller can be a hard-wired control in contrast to the DPE controller which is a program driven control with a highly specialized instruction set. Instead of nearest-neighbor communications, a global bus communications scheme between processing elements may be employed.

The CPE is optimized to compute one row of the matrix difference equation (1), that is, to perform an inner product of two vectors. $CPE_i$ computes the $k+1$th value of the continuous state variable $x_i$ by computing the inner product (2), at the kth iteration step.

$$\overset{\text{Next State}}{\underset{i=1}{\overset{n}{\Sigma}} x_i(k+1)} = \overset{\text{Present State}}{\underset{j=1}{\overset{n}{\Sigma}} a_{ij}x_j} + \overset{\text{Present Input}}{\underset{l=1}{\overset{m}{\Sigma}} b_{il}u_l} \quad (2)$$

The next state, it is seen, is a function of the present state. The CPE is composed of three sections shown in FIG. 2—the continuous random access memory or CPE memory 14, the serial input-output 15, and multiplier-accumulator 16. The serial I/O and multiplier sections have local controllers and operate concurrently. Overall CPE operation is controlled by a main CPE controller implemented by a programmable logic array which is external to memory 14. Input-output section 15 includes three serial input ports and registers 17-19, three serial output ports and registers 20-22, and a small memory (Imem) 23 and a buffer 24 which contains a control programmable logic array for controlling operation of the input/output section. The multiplier section 16 computes the product of the multiplier and the multiplicand and accumulates the sum, and contains a small control portion.

Figure 3A:
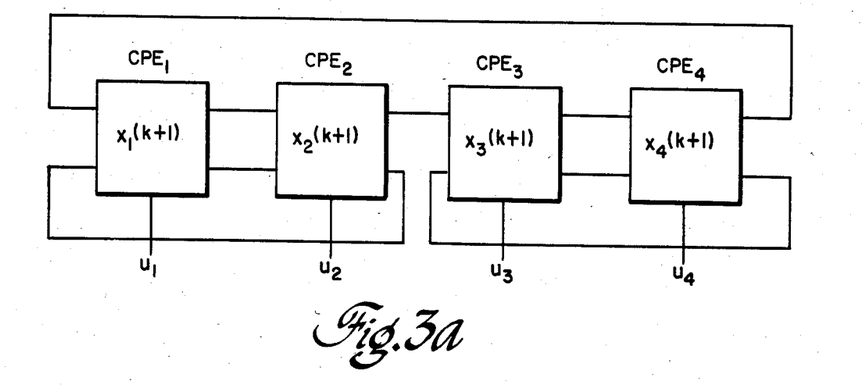
FIG. 3a depicts a 4-CPE, 4-state, 2-input system.
Figure 3B:
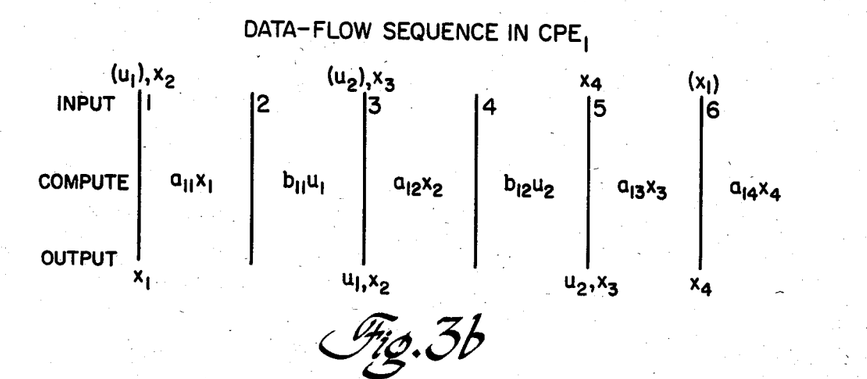
FIG. 3b illustrates the data flow sequence in the first CPE.
Figure 3C:
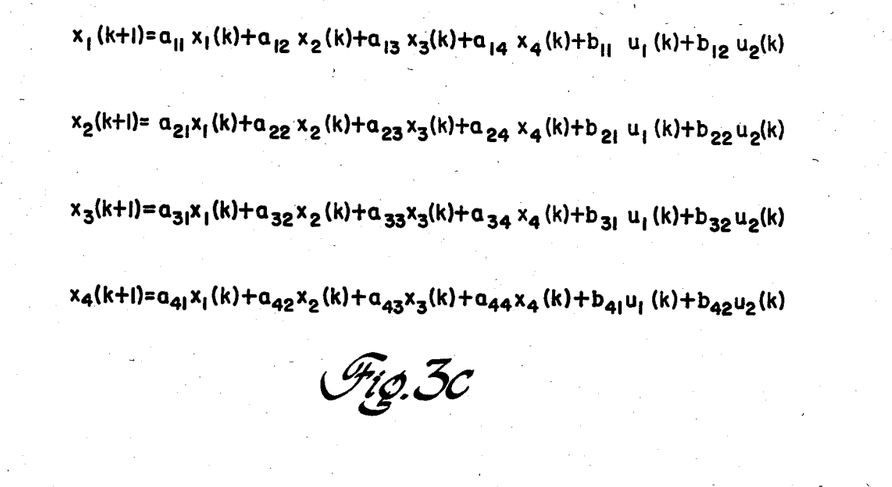
FIG. 3c gives the equations for calculating the continuous state variables for the next state in the four CPEs.

Each CPE in the multiple CPE concurrent processor for control implementation can compute one or a programmable number of rows of equation (2). FIG. 3a shows a four CPE, four state, two input system; one CPE computes one row of the matrix equation in six steps as shown in FIGS. 3b and 3c. All of the CPEs begin operation at the same time and finish at the same time, and are then ready to begin the next iteration. Computed present continuous state variables are transferred via the upper communication loop and the external inputs by the lower loops; the system input communication loop is shortened since there are only two system inputs instead of four.

The concurrent calculations of the next continuous state variables $x_1(k+1)$ to $x_4(k+1)$ are performed as follows (k stands for current time.) The terms in brackets represent states or inputs that are available internally to that CPE and are not received from the adjacent CPE. $CPE_1$ knows $x_1(k)$, the present continuous state variable, because it was computed in the just completed iteration, and it is fed input $u_1(k)$. In the same way, $CPE_2$ knows present state $x_2(k)$ and input $u_2(k)$, and so on for $CPE_3$ and $CPE_4$. Every CPE has its set of a and b state equation coefficients stored in its memory. Looking at the data-flow sequence in $CPE_1$, FIG. 3b, step 1 is that the product $a_{11}x_1(k)$ is computed, $x_2$ is input from $CPE_2$, and $x_1$ is transferred out to $CPE_4$. In step 2, $b_{11}u_1(k)$ is calculated. In step 3, $a_{12}x_2(k)$ is computed, $u_2$ and $x_3$ are input from $CPE_2$ ($x_3$ had previously been transferred from $CPE_3$), and $u_1$ is sent to $CPE_2$ and $x_2$ to $CPE_4$. In step 4, $b_{12}u_2(k)$ is calculated. In step 5, $a_{13}x_3(k)$ is computed, $x_4$ is input from $CPE_2$, and $u_2$ is sent to $CPE_2$ and $x_3$ to $CPE_4$. In step 6, $a_{14}x_4(k)$ is computed, $x_1$ is inputted from $CPE_2$ (it does not need it), and $x_4$ is outputted to $CPE_4$ (it does not need it). All of the terms in the first row, FIG. 3c, have been determined and the sum taken by the accumulator. At the same time the same process is going on in the other continuous processing elements and the results, the four next continuous state values, are available simultaneously.

If there are no system inputs, the second summation in equation (2) need not be performed. Each CPE is in fact capable of computing more than one next state variable and can also read more than one input from its input port. The CPE can be set up to compute an arbitrary number of rows of equation (2), as for example in FIG. 4, where $CPE_1$ computes both $x_1(k+1)$ and $x_2(k+1)$, in which case the number of steps or cycles is doubled. If speed requirements are easily met, a single CPE implementation can compute the entire matrix equation.

Figure 2:
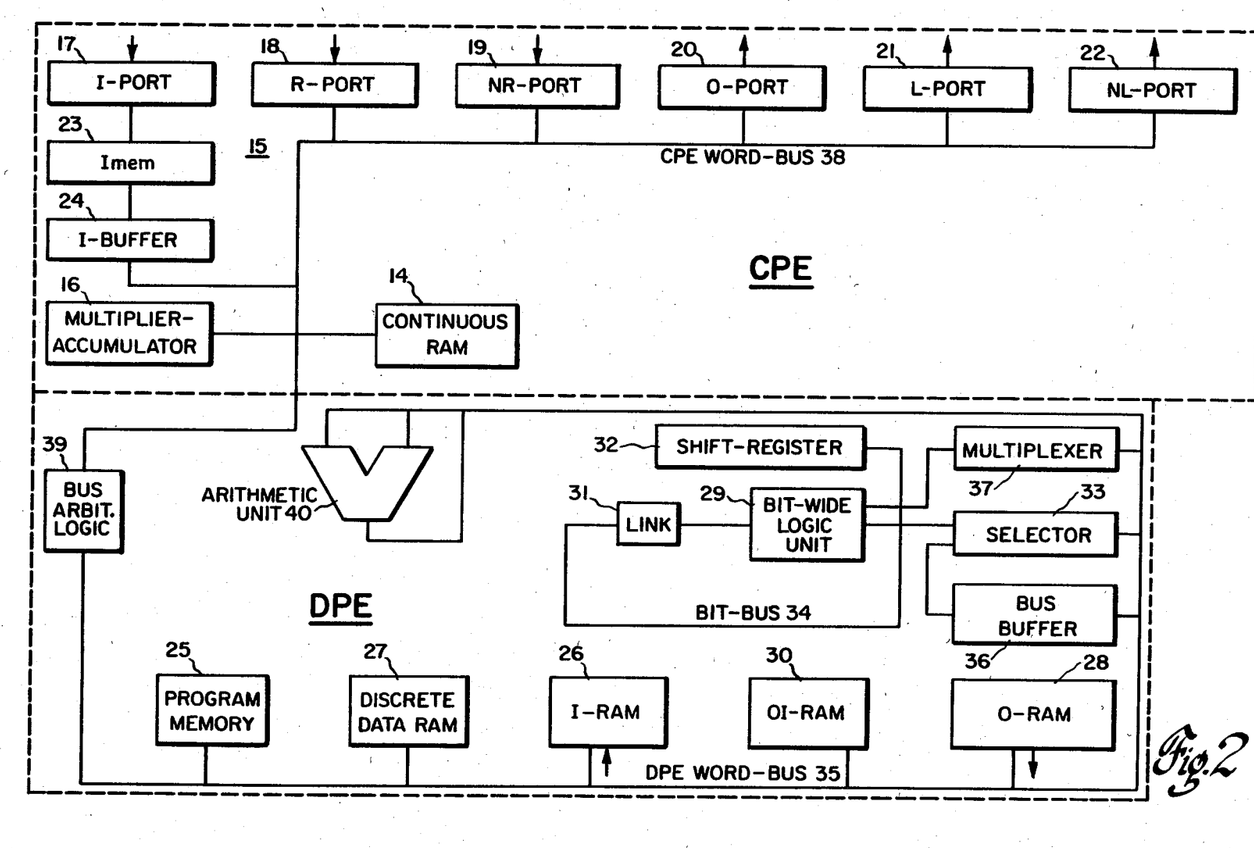
FIG. 2 is a block diagram of a single processing element comprised of continuous and discrete processing elements, CPE and DPE.

The usual operational mode of the CPE will be with the coefficients of the A and B matrices stored in CPE memory 14 (FIG. 2). However, the coefficients may be fed from an external shift register type memory, using NR-port 19. The microprocessor 12 is then able to change coefficients on-the-fly. The next major portion of CPE memory 14 is used to store the present and next state variables. The configuration is such as to allow the microprocessor 12 access to present state data, while the CPE calculates the next state. An input memory is used to store set points of the state equation. These inputs can only be written to by the user while the CPE is not busy. This data can be read by the microprocessor at any time. Another function of the CPE memory 14 is to have a section for external I/O control. The state variables are inputted and outputted using I-port and O-port 17 and 20, and the continuous inputs using R-port and L-port 18 and 21.

The CPE controller coordinates the operation of the entire CPE, and also interacts with the DPE controller to perform those operations where a discrete variable must affect the operation of the continuous control or vice versa. The CPE controller provides as much flexibility as possible without penalizing the applications that do not require flexibility. For example, if the continuous parameters or coefficients do not change or only change very infrequently, then the continuous controller can basically continue to cycle through iteration after iteration of equation (2) without any intervention. On the other hand, for those applications requiring flexibility, (for example, if after each iteration certain states need to be examined for exceeding a threshold), a provision exists for providing the desired flexibility in an efficient fashion.

For those controllers that require interaction between the CPE and DPE, the CPE controller is set up to request intervention from the DPE which is a programmed instruction machine. The CPE control is set up to interrupt the DPE and cause it to execute a fixed set of instructions on the CPE's behalf, at fixed points in a CPE control cycle. The fixed points in the control cycle where service may be requested are—after completion of input/output, after completion of a multiplication, after completing both a multiplication and input/output, after completing a single step of the iteration, and after completing an iteration. The CPE controller can be pre-programmed to skip the multiply-accumulate step completely, for example, when the nearest neighbor type of communication type facilities are being used but not necessarily to solve state equations. In other words, the architecture may be used for non-control type applications as well.

The discrete processing element (DPE) logically needs only to compute Boolean equations, for instance those with AND, OR and NOT expressions. However, the continuous-discrete interface is also carried out by the DPE, requiring the DPE to have much more capability. Hence the DPE is a programmed instruction machine, or more correctly a micro-programmable instruction machine, since the instruction set is relatively low-level. The instruction-set is also very simple; the object of the simplified instruction set is to reduce the logic required to implement the control path of the circuit. The instructions are however specialized for control type of environments, and change with the application.

The instruction set contains one-word (16 bit) instructions to manipulate bit (Boolean) states, with the operand address specified explicitly in the instruction, and two-stored (32-bit) instructions to manipulate full-word continuous states and state matrix coefficients.

The DPE therefore includes (see FIG. 2) a program memory or micro-instruction RAM 25, the discrete input RAM 26, the discrete data RAM 27, the output RAM 28, and the logic unit 29. The user code is written into the micro-instruction RAM 25 and uses the bit and word processing instructions mentioned above.

The input RAM (I-RAM) 26 contains those values of the discrete inputs that are actually used to compute the Boolean functions, whereas the old input RAM (OI-RAM) 30 contains the values read from the input port during the previous input cycle. Since many of these actual inputs come from relays, it may be necessary to debounce these inputs. The inputs read during the current input cycle can be compared with those that were read during the previous input cycle and only those input bits in the I-RAM 26 which have stopped bouncing may be selectively updated. All this can be done by an input/output nano controller, asynchronous to the operation of the programmed DPE controller. The discrete data RAM 27 contains two types of word quantities, counters and timers, that are used in conjunction with discrete states. Discrete events can reset the timers or counters or clock them and discrete flags can be altered when time delays expire or counters are zeroed.

The bit-wide logic unit 29 computes discrete state variables and performs Boolean operations on discrete operands from three possible sources—a bit selected from a word in the input RAM 26, a link 31 which contains the result of the previous logic operation and a shift register output 32, with the shift register used as a 1-bit stack. The result of the one-bit operation is always stored in the link and may optionally be pushed onto the bit-stack or written into a specific bit of a memory word, by performing a read-modify-write cycle. A selector 33 has access to the bit and word buses 34 and 35; a 16 bit word is transferred into it from a bus buffer 36. The selector can pick out, say, one bit and change it. A multiplexer 37 operates conventionally. The bit manipulating instruction set is shown below. The abbreviations are standard nomenclature given in texts on microprocessors or are explained.

TABLE 1

BIT INSTRUCTIONS

AND, OR, NOT, PUSH, POP, SET, RESET

| BADDR<10> | S<1> | M<1> | OPB<3> | BWI<1> |
|---|---|---|---|---|
| 6 | 5 | 4 | 1 | 0 |

JMPL

| PADDR<11> | LC<1> | OPB<3> | BWI<1> |
|---|---|---|---|
| 5 | 4 | 1 | 0 |

BWI< > — Bit/word instruction
OPB<3> — Opcode
M< > — Memory write/not write
S< > — Stack write/not write
BADDR<10> — Bit memory address
LC< > — Link condition true/false
PADDR< > — Program branch address Ordinarily the CPE and DPE operate independently and simultaneously. The DPE word-bus 35 and CPE word-bus 38 are a common bus, split into two, and the bus arbitration logic 39 allows the two parts to become joined upon command. It was previously pointed out that an "event" occurs in the continuous world when a continuous input or state variable crosses a threshold. Hence only comparisons are needed to set or reset discrete variables. This is one of the functions, comparing, performed by the arithmetic unit 40; DPE word-bus 35 is connected to its inputs and outputs.

The following concerns the DPE word manipulating instruction set. All word manipulating instructions are 32-bit (double-word) in length (Table 2), and are used for operating on all registers and word memory locations in the CPE continuous RAM 14 and discrete data RAM 27. The instruction set is very reduced for two reasons—first it is horizontally micro-coded so that each instruction does a good deal more than a high level computer machine instruction and secondly, the reduced instruction set greatly simplifies the control required to implement it. There are only 15 instructions in this group, and almost all of them are 3-operand instructions. The operands can be one of the registers or a memory operand from continuous RAM 14 or discrete data RAM 27, or an immediate constant. The SRC1 operand, when present is always a register operand, but the SRC2 operand is either an 8-bit immediate constant or a memory operand (register-indirect) depending upon the value of the IMM-field in the instruction. Thus all instructions allow an operation between any register and an immediate constant. The destination of the operation can be in memory location or a register. The frequency of integer constants in control applications (for example, loading or comparing a value) justifies this support at the machine instruction level.

TABLE 2

WORD INSTRUCTIONS

ADD, ADDC, SUB, SUBB, SHL, SHR, LOOKUP, MOVR, MOVM

| SRC2<8> | IMM<1> | SCC<1> | SRC1<5> | R/M<1> |
|---|---|---|---|---|
| 24 | 23 | 22 | 17 | 16 |

TABLE 2-continued
WORD INSTRUCTIONS

| DEST<5> | BL<1> | BS<4> | CRS<1> | OPC<4> | BWI<1> |
|---|---|---|---|---|---|
| 11 | 10 | 6 | 5 | 1 | 0 |

STIM

| DELAY |
|---|
| 16 |

| TIMER-RATE<3> | TIMER-ID<8> | OPC<4> | BWI<1> |
|---|---|---|---|
| 13 | 5 | 1 | |

LDI

| LITERAL<16> |
|---|

| DEST<5> | BL<1> | BS<4> | CRS<1> | OPC<4> | BWI<1> |
|---|---|---|---|---|---|
| 11 | 10 | 6 | 5 | 1 | 0 |

CMP

| SRC2<8> | IMMED<1> | LS<1> | SRC1<5> | EQ<1> |
|---|---|---|---|---|
| 24 | 23 | 22 | 17 | 16 |

| DEST<5> | BL<1> | BS<4> | GT<1> | OPC<4> | BWI<1> |
|---|---|---|---|---|---|
| 11 | 10 | 6 | 5 | 1 | 0 |

CALLI, RETI, JMPD

| ADDRESS<16> |
|---|

| 00000 | BL<1> | BS<4> | CRS<1> | OPC<4> | BWI<1> |
|---|---|---|---|---|---|
| 11 | 10 | 6 | 5 | 1 | 0 |

BWI<> — Bit/Word Instruction
OPC<4> — Opcode
CRS<> — Condition Register Select
BS<4> — Condition Bit Select
BL<> — Condition Bit Logic
DEST<5> — Destination Register
R/M<> — Register/Register Indirect Destination
SRC1<5> — Source Register
SCC<> — Set Condition Code
IMM<> — Source 2 Immediate Register
SRC2<8> — Source 2
LS<> — Less than
EQ<> — Equal
GT<> — Greater than Every instruction has a conditional execution capability. A CRS (condition register select) field in the instruction determines what condition is to be satisfied for instruction execution. The condition to be satisfied for conditional execution can be one of the previously saved condition codes or a discrete (bit) state variable. This facility is provided to allow a discrete state variable to simply affect the continuous control. For example, a commonly encountered situation might be to begin to apply a continuous system input only when a discrete event has occurred. A single conditiional instruction accomplishes this operation. Adopting conventional techniques, it would be necessary to read the discrete event, mask it in order to set a condition code, skip the next instruction if the condition was not met, and change the continuous system coefficients from a zero to non-zero value in the instruction following the skip instruction. Qualitatively, it can be shown that this scenario will be frequently encountered in control applications for CPAC. All of the routine processing (where decisions do not have to be made based upon values of discrete state variables), is handled by the CPE hard-wired control as described earlier. It is only when operations are to be performed conditionally that the DPE controller must intervene.

The key is that conditional actions imply conditional execution of instructions thus justifying the overhead of carrying the bits required for conditional execution encoding.

Note that if a whole block of instructions is looking for the condition of the same discrete state variable, it is not necessary to repeatedly fetch the variable from memory each time the same condition is checked because the 16 most recently used bits are cached. The I/O memory has a cache to store these bits. Thus even in terms of processing speed, an improvement can be made because the instruction fetch pipeline can always remain full and need never be aborted as in the case of conventional microcomputers. The COMPARE instruction performs the complementary function and allows the result of a comparison operation of the continuous controller variables to set or reset a discrete state variable in a single instruction.

Figure 4:
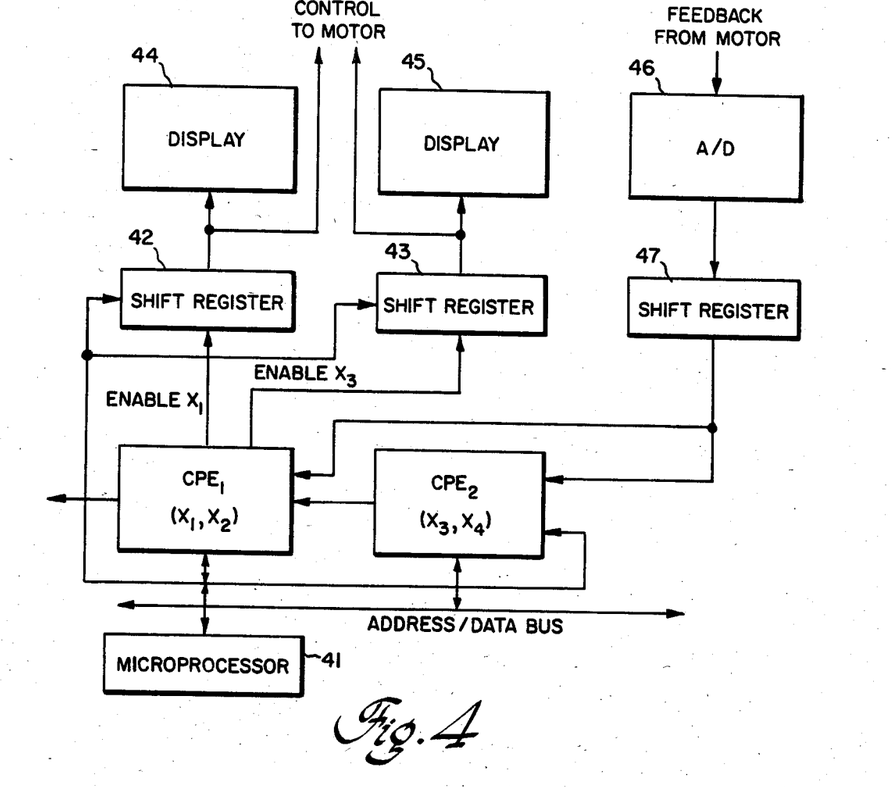
FIG. 4 relates to the implementation of a typical problem on a CPE, a motor controller, and shows the concurrent processor and interface.

FIG. 4 shows the implementation of a typical problem on a CPE; the DPE is not used at all. The system is fourth-order and has two inputs $u_1$ and $u_2$. Input $u_1$ is a set-point from a microprocessor 41 and input $u_2$ is a feedback signal from the plant. The plant could be a motor in which case the feedback signal may be motor speed and the set-point a reference signal. The control algorithm is implemented in a 2-CPE implementation to obtain faster response than a single CPE implementation, but not as fast as a 4-CPE implementation. All of the serial communication links between $CPE_1$ and $CPE_2$ are not illustrated but they are interconnected as explained. The initial values of the reference signal and the four states, $x_1$ through $x_4$, are loaded by the microprocessor upon synchronization. Later, during the actual operation, the new states are calculated by $CPE_1$ and $CPE_2$ and states $x_1$ and $x_3$ are monitored on an indicator and are also used to control the motor. The current values of $x_1$ and $x_3$ are both tapped from the serial output line of $CPE_1$, although $x_3$ could be gotten from $CPE_2$, and sent to shift registers 42 and 43 where the data is converted to parallel form. A master shift clock is used to shift $x_1$ and $x_3$ into the shift registers while the Enable $x_1$ and Enable $x_3$ signals are used to gate the shift register clock. Display devices 44 and 45 are, for instance, panel meters. The feedback signal $u_2$ from the motor is converted by an analog-to-digital converter 46, loaded into a shift register 47, and shifted into the CPE, with control signals for shifting the input in being generated by both $CPE_1$ and $CPE_2$.

Figure 5:
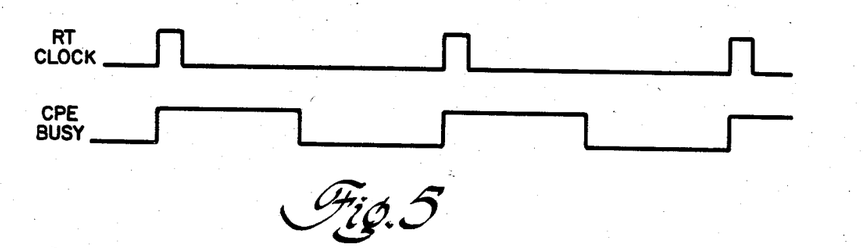
FIG. 5 shows CPE sample period timing for the system in FIG. 4.

If the microprocessor 41 wishes to examine $x_1$ and $x_2$ during operation, it can read them from the CPE memory which is mapped onto its own memory space. Internal arbitration logic within the CPE handles access conflicts between the microprocessor and the CPE. If the set-point is to be changed, then the microprocessor must wait for a BUSY signal from the CPE before changing the control reference input $u_1$. FIG. 5 shows the related timing. The RT CLOCK determinss the sampling period of the CPE and the frequency with which the display and controls to the motor get updated, and the feedback from the motor read. Within each sample period there will generally be a variable amount of CPE idle period, towards the end of the cycle. This is the period during which the microprocessor may update the CPE Input RAM which holds reference inputs such as $u_1$. The state variables, such as $x_1$ and $x_2$, may be read at any time, however.

In conclusion, an architecture called CPAC for implementing control applications has been described. The architecture uses concurrent processing with processing elements connected in a linear array and using nearest neighbor or global bus type of communications. The basic processing element contains a hard-wired continuous controller section (CPE) and a programmable discrete controller section (DPE). The DPE machine instruction set is highly specialized for control processing. Instructions are endowed with a conditional execution ability to expedite the actions that allow a discrete event to control the continuous controller. The COMPARE instruction provides the complementry capability and permits a continuous variable to affect a discrete state.

While the invention has been described with reference to preferred embodiments thereof, it will be understood by those skilled in the art that the foregoing and other changes in form and details may be made therein without departing from the spirit and scope of the invention.

What is claimed is:

1. A digital controller comprising:
multiple substantially identical processing elements interconnected in a linear array;
each processing element having a continuous and a discrete processing element in two-way communication, the first computing continuous state variables from at least one row of a matrix equation, and the second simultaneously and asynchronously computing discrete state variables; and
communication means to transfer present continuous state variables in sequence to said processing elements which concurrently calculate next continuous state variables;
said processing elements including means for outputting computed state variables to controlled equipment.

2. The digital controller of claim 1 further including a general purpose microprocessor interacting with said processing elements.

3. The digital controller of claim 2 wherein selected continuous processing elements have external inputs from the controlled equipment, and said communication means transfers said external inputs to processing elements as needed to calculate said next continuous state variables.

4. The digital controller of claim 2 wherein said continuous processing elements are hard-wired controllers and said discrete processing elements are program driven controllers.

5. The digital controller of claim 1 wherein every continuous processing element is comprised of memory means to store matrix equation coefficients and present continuous state variables including those transferred from other processing elements, input-output means, multiplier-accumulator means for multiplying said coefficients and present continuous state variables and summing the products, and first data bus means.

6. The digital controller of claim 5 wherein every discrete processing element is comprised of program memory means, input-output memory means, logic means to compute Boolean equations and said discrete state variables, arithmetic means to compare said present continuous state variables with a threshold, second data bus means, and means for joining said first and second data bus means upon command.

7. A concurrent processor for control comprising:
multiple substantially identical processing elements that are interconnected in a linear array;
each processing element having a continuous and a discrete processing element which operate simultaneously and are in two-way communication, the first computing continuous state variables and one or more rows of a state equation in discretized matrix form, and the second computing discrete state variables;

at least some of said processing elements having ports for external inputs from controlled equipment and to outut computed state variables;

serial communication links between neighboring processing elements to establish loops to transfer present continuous state values and external inputs which are needed to calculate next continuous state values concurrently in all processing elements; and a general purpose microprocessor interacting with every processing element.

8. The concurrent processor of claim 7 wherein every continuous processing element is comprised of memory means for storing state equation coefficients and present continuous state values and external inputs including those transferred from other processing elements, input-output means, and multiplier-accumulator means for multiplying coefficients by said present continuous state values and external inputs and deriving the sum of the products.

9. The concurrent processor of claim 8 wherein said continuous processing elements are hard-wired controls and said discrete processing elements are program driven controls.

10. The concurrent processor of claim 8 wherein said memory means, input-output means, and multiplier-accumulator means have access to a first data bus, and each discrete processing element has a second data bus, and means for joining said first and second data buses upon command from bus arbitration logic in each discrete processing element.

11. The concurrent processor of claim 10 wherein every discrete processing element is further comprised of program memory means, input-output memory means, a logic unit to compute Boolean equations, and an arithmetic unit to compare said present continuous state variables with a threshold, said last-mentioned units and said program and input-output memory means having access to said second data bus.

12. The digital controller of claim 7 wherein said discrete processing elements are program driven controllers and have a specialized instruction set with conditional execution capability to allow a discrete state variable to affect a continuous state variable in a single instruction.

13. A digital controller processing element comprising:

a continuous and a discrete processing element which operate independently and simultaneously and have respective data bus means that are joined upon command from the latter processing element;

said continuous processing element computing next continuous state variables and one or more rows of a state equation in discretized matrix form, and comprised of input/output means, memory means to at least store matrix equation coefficients and present continuous state variables, and means for multiplying said coefficients and present continuous state variables and summing the products;

said discrete processing element being comprised of program memory means, input/output memory means, logic means to comput Boolean functions and discrete state variables, and arithmetic means to compare said continuous state variables with a threshold.

14. The processing element of claim 13 wherein at least one of said continuous and discrete processing elements have external inputs which are utilized to calculate said state variables.

15. The processing element of claim 13 wherein said discrete processing element has a simplified instruction set and a field in the instruction determines a condition to be satisfied for instruction execution, to allow a discrete state variable to affect a continuous state variable in a single instruction.

16. The processing element of claim 15 wherein said input/output memory means has a cache to store the most recently used bits to avoid repeated fetches of the same discrete state variables.

* * * * *